United States Patent

Kotaka et al.

[11] Patent Number: 5,817,274
[45] Date of Patent: Oct. 6, 1998

[54] METHOD OF MANUFACTURING ALUMINUM NITRIDE

[75] Inventors: Hiroaki Kotaka, Hadano; Hidenori Yamaoka, Odawara; Shuitsu Matsuo, Atsugi; Masahiro Ando, Hadano; Mikiya Fujii, Narita; Hiroyuki Terada, Abiko; Yasuo Misu, Narita, all of Japan

[73] Assignees: Toshiba Ceramics Co., Ltd.; Toshiba Monofrax Co., Ltd., both of Tokyo, Japan

[21] Appl. No.: 923,458

[22] Filed: Sep. 4, 1997

Related U.S. Application Data

[63] Continuation-in-part of Ser. No. 689,170, Aug. 6, 1996, abandoned.

[30] Foreign Application Priority Data

Aug. 11, 1995 [JP] Japan .................................. 7-206027

[51] Int. Cl.[6] .................................................. C04B 35/581
[52] U.S. Cl. .......................... 264/646; 264/627; 264/640; 264/646; 423/412
[58] Field of Search .................... 264/640, 646, 264/DIG. 19, 626, 627; 423/412

[56] References Cited

U.S. PATENT DOCUMENTS

| 3,853,688 | 12/1974 | D'Ambrosio | 246/63 |
| 4,010,233 | 3/1977 | Winter et al. | 264/63 |
| 4,761,388 | 8/1988 | Oguri et al. | 501/95 |
| 4,975,260 | 12/1990 | Imai et al. | 423/412 |
| 5,279,808 | 1/1994 | Xiao t al. | 423/412 |

FOREIGN PATENT DOCUMENTS

| 2-300319 | 12/1990 | Japan . |
| 6-330412 | 11/1994 | Japan . |

*Primary Examiner*—James Derrington
*Attorney, Agent, or Firm*—Foley & Lardner

[57] ABSTRACT

Disclosed is a method of manufacturing aluminum nitride, which comprises the steps of preparing a mixed gas consisting essentially of an ammonia gas and at least 0.5% by volume of a hydrocarbon gas, calcining $\gamma$-$Al_2O_3$ or a precursor thereof at 300° to 1,100° C. so as to prepare the $\gamma$-$Al_2O_3$ having a moisture content of 1 weight % or less; heating the calcined $\gamma$-$Al_2O_3$ in the mixed gas at a temperature of 1,200° to 1,700° C., thereby preparing porous aluminum nitride having a specific surface area of 10 $m^2$/g or more; and heat-treating the porous aluminum nitride in an atmosphere of an ammonia gas, or a mixed gas of an ammonia gas and an inert gas, at 1600° to 2000° C., so as to make contents of both carbon and oxygen contained in the aluminum nitride 1 weight % or less.

21 Claims, 3 Drawing Sheets

RELATIONSHIP BETWEEN HEAT CONDUCTIVITY OF AlN AND OXYGEN CONTENT OF SINTERED BODY

METHOD OF MANUFACTURING ALUMINUM NITRIDE

CROSS-REFERENCE TO RELATED APPLICATIONS

This application is a continuation-in-part of U.S. patent application Ser. No. 8/689,170 filed Aug. 6, 1996, now abandoned.

BACKGROUND OF THE INVENTION

This invention relates to a method of manufacturing aluminum nitride, and in particular to a method of manufacturing aluminum nitride powder or aluminum nitride fibers, which enables a nitrification reaction of alumina to be effected with ease, thereby making it possible to manufacture aluminum nitride or aluminum nitride fibers in high yield and at low cost.

Aluminum nitride has been used for the manufacture of a filler to be used in a resin sealant for semiconductor element, or for the manufacture of a composite thereof with another kind of metal.

As for the manufacture of aluminum nitride fibers, a method has been proposed in Japanese Patent Unexamined Publication Hei/2-300,319, wherein alumina fibers comprising 90% by weight or more of $\alpha$-$Al_2O_3$ and less than 10% by weight of $SiO_2$ are heat-treated in a mixed gas atmosphere comprising ammonia and hydrocarbon gas at a temperature of 1,300° to 1,700° C. thereby to manufacture aluminum nitride fibers.

However, according to this known method, a sufficient nitrification reaction of alumina could hardly be effected at a temperature of less than 1,300° C., or even at a higher temperature of not less than 1,300° C.

Therefore, it has been required according to this known method to perform the nitrification reaction at a much higher temperature, taking a longer period of time. If the nitrification reaction is performed at such a higher temperature and taking a longer period of time, it is inevitable to invite an increase in cost for the manufacture of the product.

Even if such a nitrification reaction is performed at such a high temperature, taking a long period of time, it is impossible to achieve a sufficient nitrification reaction of alumina, and hence it has been impossible as a matter of fact to obtain aluminum nitride fibers whose nitrification degree is substantially 100%.

Japanese Patent Unexamined Publication Hei/6-330,412 discloses a technique of nitrifying the surface of alumina-silica fibers wherein the alumina-silica fibers were heat-treated in a mixed gas atmosphere comprising an ammonia and a hydrocarbon gas at a temperature of 1,200° to 1,600° C. It is however impossible with this prior art to effect a sufficient nitrification down to the center of the alumina-silica fibers.

Moreover, the oxygen content of aluminum nitride has a great influence on the heat conductivity thereof, and when the oxygen content exceeds 1%, the heat conductivity of aluminum nitride quickly decreases. FIG. 1 is a diagram showing the relationship between the oxygen content and heat conductivity, of a sintered body obtained by adding 1 weight % of $Y_2O_3$ to aluminum nitride, followed by sintering.

Further, Japanese Patent Examined Publication Hei/3-36,782 discloses a method of manufacturing an aluminum nitride sintered body having a high heat conductivity, by removing oxygen from a commercially available high-oxygen-content aluminum nitride. According to this method, aluminum nitride powder having a high oxygen content is heated in a non-oxidization atmosphere at a temperature of 1600° C. or higher, so as to reduce the oxygen content, and thus the powder is sintered. However, this method entails the problem of requiring a long period of time for the process in reducing the oxygen content of aluminum nitride.

More specifically, in the case of a heat treatment of 1600° C., a process of 20 hours is required, and even in the case of a treatment of 1800° C., a process of 10 hours is required. In order to complete the process in relatively a short period of time, a heat treatment of higher than 2000° C. must be carried out. However, in a high heat treatment of exceeding 2000° C., a pressure must be applied in order to prevent the sublimation of aluminum nitride. As a result, the device and the operation thereof both become complicated, thereby causing a high production cost.

BRIEF SUMMARY OF THE INVENTION

Accordingly, an object of the present invention is to provide a method for preparing aluminum nitride having low carbon and oxygen contents, with ease and in high yield, wherein a mixed gas consisting essentially of an ammonia gas and at least 0.5% by volume of a hydrocarbon gas is prepared and then $\gamma$-$Al_2O_3$ or a precursor of $\gamma$-$Al_2O_3$ is calcined, the $\gamma$-$Al_2O_3$, a moisture content thereof was adjusted to 1 weight %, is heat-treated at 1,200° to 1,700° C., so as to form a porous aluminum nitride material having a specific surface area of 10 m$^2$ or more, and the porous aluminum nitride material is further heat-treated at 1,600° to 2,000° C. in an atmosphere of an ammonia gas, or a mixed gas of an ammonia gas and an inert gas, so as to obtain aluminum nitride having both a carbon content and an oxygen content of 1 weight % or less.

Another object of this invention is to provide a method for efficiently manufacturing aluminum nitride, wherein a heat treatment of 1300° to 1460° C. is carried out so as to form porous aluminum nitride.

Another object of the present invention is to provide a method of efficiently manufacturing aluminum nitride, wherein the precursor of $\gamma$-$Al_2O_3$ is one selected from the group consisting of aluminum alkoxide, aluminum sulfate, aluminum alum, aluminum carbonate ammonium, aluminum hydroxy chloride and boehmite.

A still another object of the present invention is to provide a method of manufacturing aluminum nitride, wherein $\gamma$-$Al_2O_3$ or the precursor thereof is in the form of powder or flakes.

A still another object of the present invention is to provide a method of effectively manufacturing preparing aluminum nitride, wherein $\gamma$-$Al_2O_3$ or the precursor thereof at least partially contains aluminum hydroxy chloride.

A still another object of the present invention is to provide a method of manufacturing aluminum nitride fibers, wherein aluminum hydroxy chloride is dispersed in a dispersion containing a binder and one of colloidal silica, colloidal alumina and colloidal alumina, the diespersion containing the above is concentrated, short fibers are spun from the concentrated dispersion placed in a centrifugal spinning machine, the short fibers are dried to obtain the precursor of $\gamma$-alumina, the dried short fibers are calcined so as to make a moisture content thereof 1 weight % or less, and the calcined short fibers are heat-treated in the mixed gas of hydrocarbon gas and ammonia gas, at a temperature of 1200° to 1700° C. so as to form porous aluminum nitride fibers having a specific surface area of 10 m$^2$/g or more, and the porous aluminum nitride fibers in the atmosphere of an ammonia gas, or a mixed gas of ammonia gas and an inert gas, at a temperature of 1600° to 2000° C. so as to make both carbon and oxygen contents thereof 1 weight % or less.

DETAILED DESCRIPTION OF THE INVENTION

Figure 1:
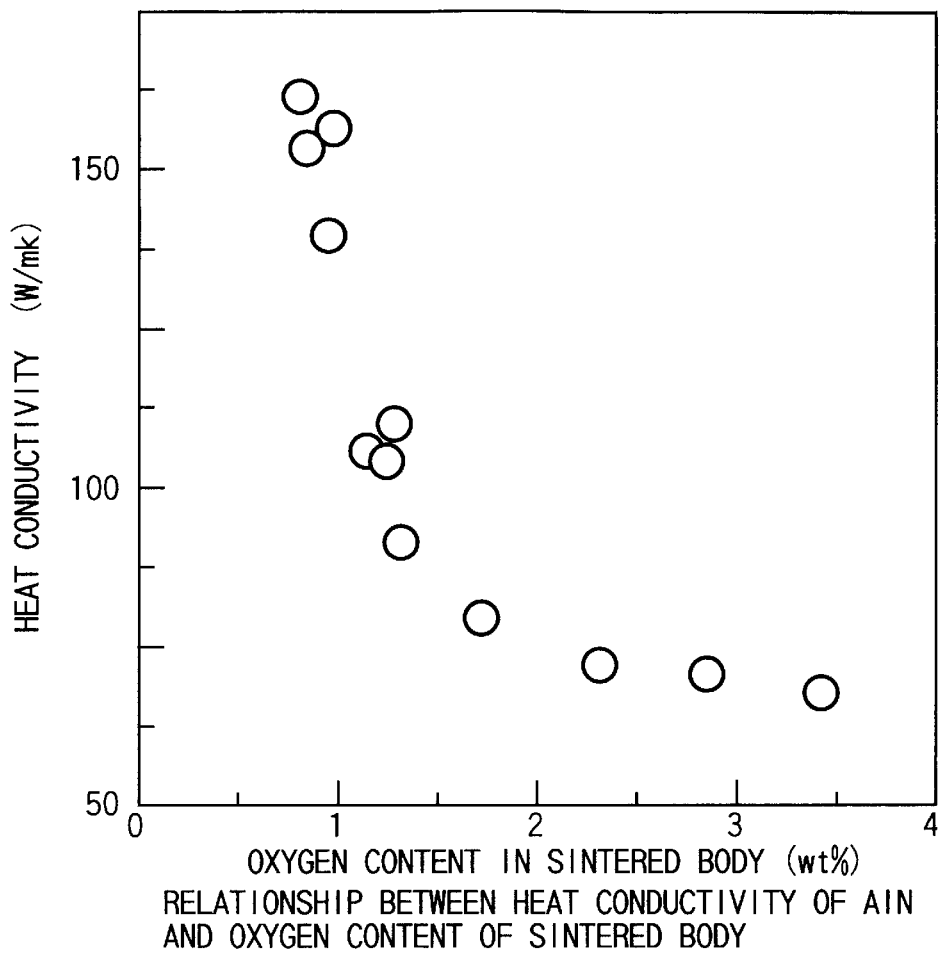
FIG. 1 is a graph showing the correlation between an oxygen content (wt %) and heat conductivity of a sintered body made of aluminum nitride powder added with 1 wt % of $Y_2O_3$.

This invention provides a method of manufacturing aluminum nitride, which comprises a step of heat-treating γ-$Al_2O_3$ or a precursor of γ-$Al_2O_3$ in a mixed gas consisting essentially of a hydrocarbon gas and an ammonia gas.

The term of "a precursor of γ-$Al_2O_3$" employed herein should be understood to mean a material before being converted into γ-$Al_2O_3$, or mean, if this material is heat-treated in advance at a temperature of 1,000° C. to 1,100° C., a gelled material before being converted into γ-$Al_2O_3$. The γ-$Al_2O_3$ can be manufactured by thermally decomposing an organic or inorganic aluminum compound. Examples of such an organic or inorganic aluminum compound are aluminum alkoxide, aluminum sulfate, aluminum alum, ammonium aluminum carbonate and aluminum hydroxy chloride. These aluminum compounds are specific examples of the precursor of γ-$Al_2O_3$".

Further, the term of "γ-$Al_2O_3$ or the precursor thereof" employed herein should be understood to mean particles or flakes of γ-$Al_2O_3$ or the precursor thereof.

After extensive studies made by the present inventors with respect to the conventional manufacturing method for aluminum nitride, it has been found that the reaction temperature and time required for the nitrification of alumina vary greatly depending on the kinds of raw alumina material to be used for the nitrification reaction.

For example, when α-alumina or δ-alumina is employed as a raw alumina material for the nitrification reaction, such a high reaction temperature as more than 1,500° C. and such a long reaction time as not less than 5 hours are required. Moreover, even if the heat treatment is conducted at such a high temperature and for a long period of time, it is hardly possible to substantially completely nitrify the raw alumina material.

Whereas, it has been found that if γ-$Al_2O_3$ is employed as a raw alumina material, the reaction temperature required for the nitrification reaction can be lowered remarkably, and at the same time the reaction time can also be greatly reduced.

The reason of this has been studied by the present inventors to find out that this can be attributed to the inherent large specific surface area of γ-$Al_2O_3$.

Namely, it has been found that the specific surface area of γ-$Al_2O_3$ is about 10 times as large as that of α-alumina, so that when an ammonia gas is contacted with this large specific surface area of γ-$Al_2O_3$, the nitrification reaction of γ-$Al_2O_3$ can be prominently promoted.

It has been found that in the process of producing γ-$Al_2O_3$, prominent dehydration is caused to occur, thus leaving a large number of fine pores 10 to 100 angstroms in diameter in the particle of γ-$Al_2O_3$, whereby enlarging the specific surface area of γ-$Al_2O_3$. When this γ-$Al_2O_3$ is further heated, it is converted into α-$Al_2O_3$, concurrently losing a large number of fine pores, thus sharply decreasing the specific surface area of α-$Al_2O_3$.

In this invention, γ-$Al_2O_3$ having a large number of fine pores and an extremely large surface area as explained above is taken notice of and utilized for promoting nitrification reaction in the manufacture of aluminum nitride via a process of contacting the γ-$Al_2O_3$ with a mixed gas consisting essentially of a hydrocarbon gas and ammonia gas.

As for the γ-$Al_2O_3$ to be employed in this invention, the γ-$Al_2O_3$ that can be obtained by the thermal decomposition of an organic or inorganic aluminum compound or all kinds of precursors thereof would be useful. In particular, the γ-$Al_2O_3$ that can be obtained by the thermal decomposition of aluminum hydroxy chloride as an alumina source, or the precursor constituted by this aluminum hydroxy chloride is more preferable for use as a γ-$Al_2O_3$ or the precursor thereof to be employed in this invention, since these compounds are highly reactive with nitrogen and excellent in moldability.

The mechanism of the thermal decomposition of the aluminum hydroxy chloride can be expressed as follows.

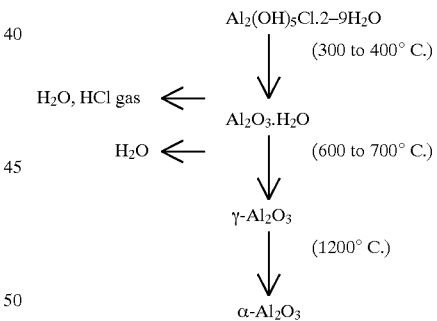

As seen from above drawing, when aluminum hydroxy chloride is heated at a temperature of 300° to 400° C., the aluminum hydroxy chloride is converted into an alumina hydrate ($Al_2O_3 \cdot H_2O$) while emitting HCl and $H_2O$. When this alumina hydrate is further heated to 600° to 700° C., it is then converted into γ-$Al_2O_3$ while emitting $H_2O$. When this γ-$Al_2O_3$ is further heated to 1200° C. or more, it is then converted into α-$Al_2O_3$.

As explained above, the production of this intermediate product of γ-$Al_2O_3$ is accompanied by the release of $H_2O$ and HCl gas, resulting in the formation of a large number of pores in the γ-$Al_2O_3$, thus giving a large specific surface area to the γ-$Al_2O_3$.

Therefore, in the present invention, the γ-$Al_2O_3$ or the precursor thereof is subjected to nitrification. However, the γ-$Al_2O_3$ still contains moisture at this point. The γ-$Al_2O_3$ or the precursor thereof is then calcined to make the moisture content thereof 1 weight % or less. In order to make the moisture content of the γ-$Al_2O_3$ 1 weight % or less, it suffices if the γ-$Al_2O_3$ or the precursor thereof is heat-treated at a temperature of 300° to 1100° C. When the calcining temperature is less than 300° C., $H_2O$ or HCl is not sufficiently removed, whereas when the calcining temperature exceeds 1100° C., the γ-$Al_2O_3$ might be transformed into α-$Al_2O_3$.

Next, the γ-$Al_2O_3$, the moisture content of which was made 1 weight % or less, is heat-treated under a mixed gas consisting of at least 0.5 volume % or more of a hydrocarbon gas and an ammonia gas, at a temperature of 1200° to 1700° C., thereby obtaining a porous aluminum nitride having a specific surface area of 10 $m^2/g$ or more.

In this reaction, γ-$Al_2O_3$ is reduced by an ammonia gas and a hydrocarbon gas to produce aluminum nitride. A raw material to be subjected to the nitrification reaction may be γ-$Al_2O_3$ per se or may be a precursor of γ-$Al_2O_3$ which can be transformed into γ-$Al_2O_3$ as it is heated to 1,000° to 1,100° C. in the reaction of forming aluminum nitride.

The reason for limiting the content of a hydro-carbon gas to not less than 0.5% by volume in the feed gas to be supplied to the nitrification reaction is as follows. Namely, if the content of a hydrocarbon gas is less than 0.5% by volume, the partial pressure of hydrocarbon gas may become insufficient so that the rate of nitrification reaction of γ-$Al_2O_3$ may become extremely low. The hydrocarbon gas serves to remove $H_2O$ generated from the reaction between γalumina and ammonia. In view of suppressing an excessive generation of carbon, the content of a hydrocarbon gas should preferably be controlled to not more than 20% by volume. As for the hydrocarbon gas, any of propane gas, methane gas, ethane gas and butane gas may be employed. However, propane gas is most preferable because it is available at low cost.

The nitrification reaction is performed at a heating temperature of 1,200° to 1,700° C. If this heating temperature is less than 1,200° C., the reaction rate becomes too low, thus taking a long period of time, and at the same time it would be hardly possible to completely achieve the nitrification reaction of γ-$Al_2O_3$. With respect to the upper limit for the heating temperature, although a temperature of 1,460° C. may be sufficient for completely achieving the nitrification reaction, a higher temperature than 1,460° C. may be employed in view of accelerating the reaction. The heating temperature higher than 1,700° C. is not preferable, since it will lead to an increase in manufacturing cost. Therefore, the preferable range for the heating temperature is from 1,300° C. to 1,460° C.

Further, the porous aluminum nitride is heat-treated in an atmosphere of an ammonia gas, or a mixed gas of an ammoinia gas and an inert gas, at a temperature of 1600° to 2000° C., so as to make both carbon and oxygen contents of the aluminum nitride 1 weight % or less. With this heat treatment, the crystal growth of porous aluminum nitride occurs, and thus pores are filled. Consequently, aluminum nitride densed having a small specific surface area and a low oxygen content, can be obtained.

In the above-described case, when the heating temperature is less than 1600° C., the crystal growth of aluminum nitride does not sufficiently proceed, and therefore it is not possible to obtain sufficiently dense and low-oxygen aluminum nitride. Further, it is not necessary to carry out a heat treatment of higher than 2000° C. A preferable temperature falls within a range of 1600° to 1800° C., and with such a preferable temperature, low-oxygen aluminum nitride can be prepared within a short period of time.

In the case where a treatment using an ammonia gas or a mixed gas of an ammonia gas and an inert gas, is carried out, the product having low oxygen and carbon contents can be obtained. In this case, after γ-alumina is converted into aluminum nitride by use of a mixed gas of an ammonia gas and a hydrocarbon gas, it suffices if the supply of carbohydrate gas is stopped so as to supply the ammonia gas solely, or an inert gas is supplied in place of the hydrocarbon gas so as to make a mixed gas of the ammonia gas and the inert gas. With the technique described above, a carbon decomposition operation of ammonia and a crystal growth of aluminum nitride are carried out at the same time without exposing aluminum nitride having a high specific surface area to air, thus aluminum nitride having a low oxygen content and less carbon remaining, can be obtained.

As an atmospheric gas, an inert gas can be used in place of the ammonia gas or the mixed gas of the ammonia gas and inert gas. An atmospheric gas is preferable since an inert gas prevents the corrosion of the device. In the case where an oxidation decarbonation treatment is carried out in advance as a pretreatment, the product having a low carbon content can be obtained.

It is also possible according to this invention to manufacture aluminum nitride fibers by employing γ-$Al_2O_3$ fibers as a raw alumina material to be nitrified. In this case also, a mixed gas consisting essentially of a hydrocarbon gas and an ammonia gas is prepared at first as mentioned above. As a starting material for alumina, a liquid precursor of γ-$Al_2O_3$ can be employed. As mentioned above, the precursor of γ-$Al_2O_3$ should preferably be constituted entirely or partially by aluminum hydroxy chloride.

This liquid precursor is dispersed in an aqueous solution containing a material selected from the group consisting of colloidal silica, colloidal alumina and colloidal zirconia to obtain a dispersion. Any of colloidal silica, colloidal alumina and colloidal zirconia functions as a binder for combining particles of γ-$Al_2O_3$ with each other. In addition to these binders, another binder for spinning such as polyvinyl alcohol may be added.

The dispersion thus obtained is then concentrated with a rotary evaporator to obtain a viscous gel-like material. The viscosity of this gel-like material may be about 30 poise in general. This viscous solution is then introduced into a centrifugal spinning machine provided on the outer peripheral wall thereof with a large number of fine openings, and thereafter the centrifugal spinning machine is rotated in a chamber filled with a dry hot air heated to about 100° C. As a result, the viscous solution is extruded out of these fine openings formed on the outer peripheral wall of the spinning machine thereby producing short fibers. The surfaces of the short fibers thus spun are then immediately dried by the hot air in the chamber. Subsequently, the short fibers are dried entirely including the core portion of the fibers thereby to obtain ordinary short fibers.

Subsequently, the short fibers are collected and calcined at a temperature of 300° to 1,100° C., thereby making the moisture content 1 weight % or less and removing volatile matters such as $H_2O$ or HCl that have been kept in the precursor. If the temperature of calcination is less than 300° C., the calcination can not be fully effected. On the other hand, if the temperature of calcination exceeds over 1,100° C., the precursor may be converted via γ-$Al_2O_3$ to a-$Al_2O_3$. The precursor (short fibers) thus calcined is then heat-treated in the aforementioned mixed gas consisting essentially of a hydrocarbon gas and an ammonia gas at a temperature of 1,200° to 1,700° C. thereby accomplishing the nitrification of the short fibers.

Even in the manufacture of the aluminum nitride fibers, it is preferable to select one or more kinds of the hydrocarbon gases from propane gas, methane gas, ethane gas and butane gas.

The heating temperature in the nitrification reaction in this case should preferably be in the range of 1,300° C. to 1,460° C. as in the case of preparing the aforementioned aluminum nitride.

It is also possible to form a mat by making use of the aforementioned process, wherein the short fibers are simply gathered as they are extruded from a large number of fine openings formed on the outer peripheral wall of the spinning machine to form the mat. In this case, the mat is calcined at a temperature of 300° C. to 1,100° C., and then heat-treated in a mixed gas consisting essentially of a hydrocarbon gas and an ammonia gas. The heat-treated mat is further heat-treated in an atmosphere of an ammonia gas, or a mixed gas of an ammonia gas and an inert gas, at a temperature of 1600° to 2000° C. to form a mat composed of aluminum nitride fibers. Alternatively, only an inert gas can be used as the atmospheric gas; however in this case, it is necessary to carry out an oxidation-decoarbonization treatment in advance.

Even in the manufacture of a mat composed of the aluminum nitride fibers, it is preferable to select one or more kinds of the hydrocarbon gases from propane gas, methane gas, ethane gas and butane gas.

The heating temperature to be employed in the heat-treatment of the mat composed of the calcined short fibers should preferably be in the range of 1,300° C. to 1,460° C. as in the case of preparing the aforementioned aluminum nitride solid body.

(EXAMPLE 1)

A $\gamma$-$Al_2O_3$ powder obtained from a raw material of aluminum hydroxy chloride (average particle diameter: 10 $\mu$m) was calcined in air at a temperature of 900° C. for 2 hours. The $\gamma$-$Al_2O_3$ powder thus calcined was then heat-treated in mixed gas consisting essentially of 5% by volume of propane gas and an ammonia gas at a temperature of 1,400° C. for 1 hour to perform the nitrification of the $\gamma$-$Al_2O_3$ powder.

Then, the $\gamma$-$Al_2O_3$ powder was heat-treated in an ammonia gas atmosphere under an atmospheric pressure at 1500° to 2000° C.

Figure 2:
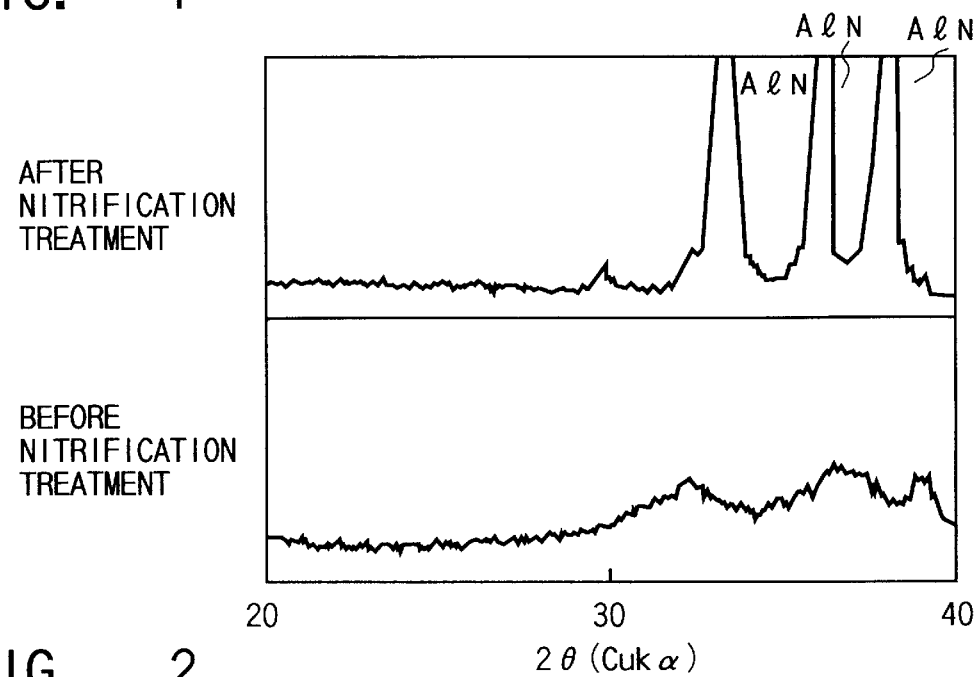
FIG. 2 is a graph showing both X-ray diffraction of γ-alumina particles prior to the nitrification thereof which are employed in the examples of this invention and X-ray diffraction of aluminum nitride particles obtained according to this invention.

When the $\gamma$-$Al_2O_3$ powder thus nitrified was examined by means of X-ray diffraction, the complete nitrification of the $\gamma$-$Al_2O_3$ powder was confirmed. Further, when the $\gamma$-$Al_2O_3$ powder thus nitrified was examined by an electron microscope, there was no significant change in the diameter of the powder. FIG. 2 shows an X-ray diffraction of aluminum nitride particles obtained in this example.

Subsequently, portions of thus obtained $\gamma$-$Al_2O_3$ powder were subjected to an ammonia treatment for two hours at several temperatures, respectively, within a range of 1500° to 2000° C. (atmospheric pressure), and the specific surface area of each portion was measured by a BET method (using a fluid specific surface area automatic measuring device). The results were summarized in FIG. 3.

Figure 3:
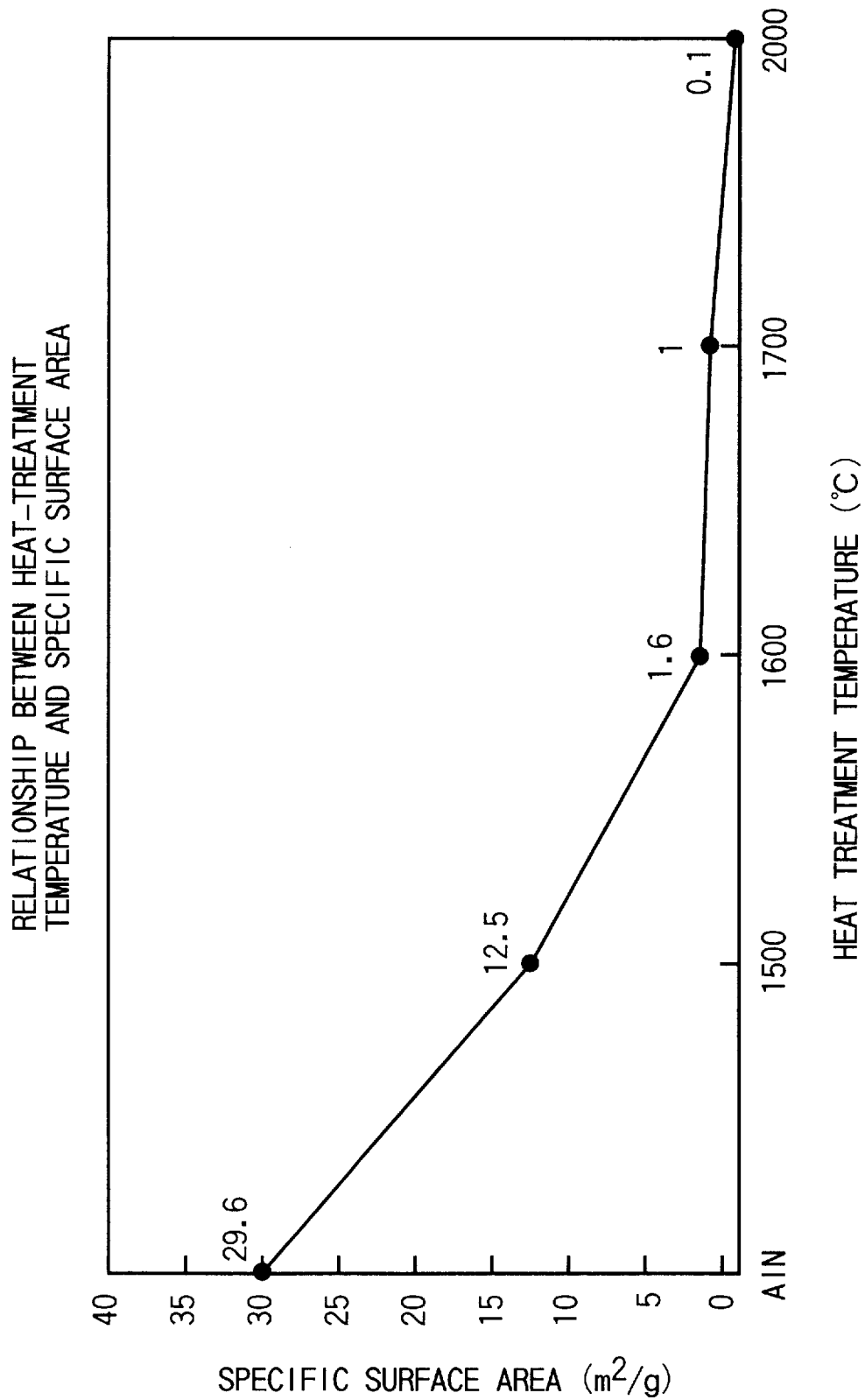
FIG. 3 is a graph showing the correlation between a heat treatment temperature and a specific surface area of aluminum nitride.

As can be seen in FIG. 3, as the treatment temperature increases, the crystal growth proceeds and the surface area of the $\gamma$-$Al_2O_3$ powder decreases. When the treatment temperature becomes 2000° C., the specific surface area becomes 0.1 m 2/g, which is very close to the limit value of the measurement by the BET method. Further, those which were subjected to a treatment of an ammonia gas atmosphere at several temperatures, were examined in terms of the oxygen content by an oxygen analyzer, and the results were as summarized in Table 1 below.

TABLE 1

| Treatment temperature (°C.) | Oxygen content (Wt %) |
|---|---|
| Before treatment | 4.0 |
| 1500 | 2.2 |
| 1600 | 1.0 |
| 1700 | 0.4 |
| 2000 | 0.3 |

(EXAMPLE 2)

To 3,200 g of a solution of aluminum hydroxy chloride (the content of Al therein was 23.5 wt. % when calculated as $Al_2O_3$) were added 697 g of 10 wt. % conc. polyvinyl alcohol solution and 116g of 20 wt. % conc. colloidal silica to obtain a mixed solution. After stirring, this mixed solution was concentrated by making use of a rotary evaporator to obtain a gel-like material having a viscosity of 35 poise at a temperature of 20° C. (a precursor of $\gamma$-$Al_2O_3$).

This viscous liquid was dripped on a disk rotating at a rotational speed of 1,000 r.p.m. in a chamber filled with dry air. As a result, the liquid thus dripped was immediately spread out in the form of disk and blown away by the centrifugal force of the disk, thus forming small particles. These particles were collected and dried at a temperature of 100° C. When these dried particles were examined by an electron microscope, these particles were found to have a flake-like shape about 5 $\mu$m in thickness and 10 to 50 $\mu$m in both width and length.

Then, these flake-like $\gamma$-$Al_2O_3$ particles were calcined in air at a temperature of 900° C. for 2 hours in the same manner as in Example 1. Thereafter, these flake-like $\gamma$-$Al_2O_3$ particles thus calcined were heat-treated as in the case of Example 1 in mixed gas consisting essentially of 5% by volume of a propane gas and an ammonia gas at a temperature of 1,400° C. for 1 hour to perform the nitrification of the $\gamma$-$Al_2O_3$ powder. As a result, flakes of aluminum nitride were obtained.

Subsequently, the flakes of aluminum nitride were subjected to an ammonia treatment at a temperature of 1700° C. (atmospheric pressure) for 2 hours, and the specific surface area thereof was measured by the BET method, to be 2.3 $m^2$/g. Further, the oxygen and nitrogen contents were measured with the oxygen-nitrogen analyzer, to be 0.6 weight %.

(EXAMPLE 3 AND COMPARATIVE EXAMPLE 1)

To 3,200 g of a solution of aluminum hydroxy chloride (the content of Al therein was 23.5 wt. % when calculated as $Al_2O_3$) were added 697 g of 10 wt. % conc. polyvinyl alcohol solution and 116 g of 20 wt. % conc. colloidal silica to obtain a mixed solution. After stirring, this mixed solution was concentrated by making use of a rotary evaporator to obtain a gel-like material having a viscosity of 35 poise at a temperature of 20° C. (a precursor of $\gamma$-$Al_2O_3$).

This viscous liquid was introduced into a cylindrical centrifugal spinning machine having a length of 600 mm, a diameter of 200 mm and provided on its outer peripheral wall with a large number of small openings each having a diameter of 0.5 mm. This spinning machine was allowed to rotate at rotational speed of 2,000 r.p.m. in a chamber filled with dry air, thereby extruding the viscous liquid through the small openings formed on the outer peripheral wall of the spinning machine to obtain short fibers. After being dried at a high temperature in the chamber, these short fibers were collected and calcined at a temperature of 900° C. for 2 hours to obtain short fibers of $\gamma$-$Al_2O_3$. The short fibers were then heat-treated in mixed gas consisting essentially of propane gas and an ammonia gas at a temperature of 1,400° C. for 1 hour, with the content of the propane gas in the mixed gas being changed variously, to obtain aluminum nitride fibers.

Subsequently, the short fibers of aluminum nitride were subjected to an ammonia treatment at a temperature of 1800° C. (atmospheric pressure) for 2 hours, and the specific surface area thereof was measured by the BET method, to be 0.3 $m^2/g$. Further, the oxygen content was measured with the oxygen analyzer, to be 0.4 weight %.

When the crystalline phase of aluminum nitride fibers thus obtained were examined by means of X-ray diffraction, the results shown in Table 2 (No. 3 to No. 5) were obtained.

The crystalline phase of aluminum nitride fibers which was subjected to the nitrification treatment without incorporating propane gas in the gas atmosphere (No. 1), as well as the crystalline phase of aluminum nitride fibers which was subjected to the nitrification treatment in the gas atmosphere where the content of propane gas was decreased to smaller than the lower limit as defined by this invention (No. 2) are also shown as Comparative Examples in this Table 2.

TABLE 2

Change in crystalline phase of AlN depending on the content of LP gas

| No. | Content of LP gas (vol. %) | Crystalline phase of nitrified fibers |
| --- | --- | --- |
| (1) | Not included | $\alpha$-$Al_2O_3$ + AlN |
| (2) | 0.3 | $\alpha$-$Al_2O_3$ + AlN (Broad) |
| 3 | 0.5 | AlN |
| 4 | 1.0 | AlN |
| 5 | 3.0 | AlN |

(EXAMPLE 4)

The short fibers of $\gamma$-$Al_2O_3$ obtained from the sample No. 5 in Example 3 (Table 2) were collected to form a mat 40 mm in width, 100 mm in length and 25 mm in thickness. This mat was composed of 94 wt. % of fibers and the balance of a mixture of particles and flakes, both having a size smaller than 0.5 mm mesh.

6 pieces of the mat were prepared, and they were separated into three pairs. These pairs of mats were subjected to heat treatment at a temperature of 300° C., 650° C. and 800° C., respectively for 30 minutes, thereby obtaining three kinds of calcined mats. All of the calcined mats were found to be amorphous, and specific surface area of fibers constituting these calcined mats was 54.2 $m^2/g$.

Each pair of mats was further heat-treated for 30 minutes in air atmosphere at a temperature of 1,000° C. and 1,100° C., respectively. When the resultant mats were examined by means of X-ray diffraction, all of them were found to have been converted into $\gamma$-$Al_2O_3$ so that they were suited for the manufacture of aluminum nitride through nitrification reaction.

Then, these calcined mats were subjected to a nitrification treatment. This nitrification treatment was performed by introducing the calcined mats into an alumina boat, and then by heat-treating the calcined mats in a mixed gas atmosphere comprising 3% by volume of propane and the balance of ammonia gas at a temperature of 1,200° to 1,400° C. for 3 hours. Thereafter, these nitrified mats were subjected to a decarbonization treatment by further heating them at a temperature of 700° C. for 5 hours. Thus-obtained mats were subjected to a nitirification treatment in an $N_2$ gas atmosphere under an atmospheric pressure at 1800° C. for 2 hours. The resultant mats were examined regarding the composition thereof by means of X-ray diffraction. The results are shown in Table 3 as No. 6 to No. 11.

TABLE 3

Relationship between calcining temperature/nitrification temperature and crystalline phase of product

| | Material to be nitrified (A) | | | material A to be nitrified | | Nitrification treatment | | After nitrification treatment of A |
| --- | --- | --- | --- | --- | --- | --- | --- | --- |
| No. | Analized value of $Al_2O_3$ | Calcination temp. °C. | After calcination | When A is heated at 1000° C. | When A is heated at 1100° C. | Nitrification temp. °C. | Annealiy temperature (°C.) | |
| 6 | 97 | 300 | Amorphous | $\gamma$-$Al_2O_3$ | $\gamma$-$Al_2O_3$ | 1200 | 1800 | AlN |
| 7 | 97 | 300 | Amorphous | $\gamma$-$Al_2O_3$ | $\gamma$-$Al_2O_3$ | 1400 | 1800 | AlN |
| 8 | 97 | 650 | Amorphous | $\gamma$-$Al_2O_3$ | $\gamma$-$Al_2O_3$ | 1200 | 1800 | AlN |
| 9 | 97 | 650 | Amorphous | $\gamma$-$Al_2O_3$ | $\gamma$-$Al_2O_3$ | 1400 | 1800 | AlN |
| 10 | 97 | 800 | Amorphous | $\gamma$-$Al_2O_3$ | $\gamma$-$Al_2O_3$ | 1200 | 1800 | AlN |
| 11 | 97 | 800 | Amorphous | $\gamma$-$Al_2O_3$ | $\gamma$-$Al_2O_3$ | 1200 | 1800 | AlN |

Figure 4:
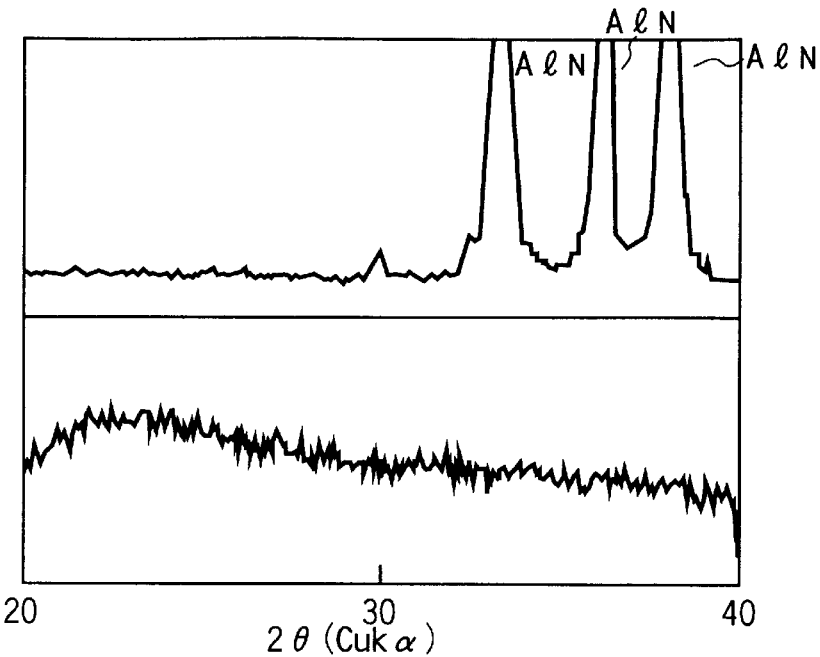
FIG. 4 is a graph showing both X-ray diffraction of γ-alumina fibers prior to the nitrification thereof which are employed in the examples of this invention, and X-ray diffraction of aluminum nitride fibers obtained by the nitrification of the γ-alumina fibers.

As will be clear from Table 3, all of the mats obtained according No. 6 to No. 11 indicated the formation of AlN. FIG. 4 shows graphs of X-ray diffraction of the mat of No. 9 before the nitrification treatment and after calcined at 650° C., and of the mat which had been nitrified.

(EXAMPLE 5 AND COMPARATIVE EXAMPLE 2)

The short fibers of $\gamma$-$Al_2O_3$ obtained in the same manner as in the case of the sample No. 5 in Example 3 (Table 2) were calcined to obtain $\gamma$-$Al_2O_3$ fibers.

The $\gamma$-$Al_2O_3$ fibers were then heat-treated in mixed gas stream comprising 2% by volume of propane gas and the balance of ammonia gas, with the temperature for heat treatment being changed variously, to obtain aluminum nitride fibers. Thus obtained aluminum nitride fibers were subjected to a treatment by heating them in a mixed gas atmosphere of a nitrogen gas and an ammonia gas, at a temperature of 1700°, for 2 hours.

The crystalline phase of aluminum nitride fibers thus obtained were examined by means of X-ray diffraction, and then the content of oxygen in the fibers was measured using an oxygen/nitrogen simultaneous analyzer. The results obtained are shown in Table 4 together with Comparative Examples (No. 12 to No. 13).

TABLE 4

Relationship between nitrification temperature and content of $O_2$ in AlN fibers

| No. | Nitrification temp. (°C.) | Annealing temperature (°C.) | Crystalline phase of nitrified Fibers | Content of $O_2$ in fibers (wt %) |
|---|---|---|---|---|
| (12) | 1000 | 1700 | $\gamma$-$Al_2O_3$ | 43 |
| (13) | 1100 | 1700 | $\gamma$-$Al_2O_3$ | 26 |
| 14 | 1200 | 1700 | AlN | 0.9 |
| 15 | 1300 | 1700 | AlN | 0.7 |
| 16 | 1400 | 1700 | AlN | 0.4 |
| 17 | 1460 | 1700 | AlN | 0.4 |
| 18 | 1650 | 1700 | AlN | 0.4 |

As seen from Table 4, the nitrification treatment of $\gamma$-$Al_2O_3$ is required to be performed at a temperature of not less than 1,200° C. Namely, when the nitrification treatment of $\gamma$-$Al_2O_3$ is performed at a temperature of not less than 1,200° C., the content of oxygen the resultant aluminum nitride fibers can be minimized. If the content of oxygen in the fibers is high, the heat conductivity of the fibers increases undesirably.

In Comparative Examples (No. 12 to No. 13), the temperature for the nitrification treatment was performed at a temperature of 1,000° C. and 1,100° C. respectively, thus failing to produce aluminum nitride and at the same time exhibiting a high oxygen content, i.e. 43 weight % and 23 weight % respectively in the fibers.

The aluminum nitride obtained in No. 14 to No. 18 of Example 5, and the products obtained in Comparative Examples No. 12 to No. 13) were measured in terms of nitrification degree by making use of a thermobalance. Table 5 shows the results obtained. As seen from Table 5, all aluminum nitride samples obtained according to this invention indicated a nitrification degree of 100%.

TABLE 5

Relationship between nitrification temperature and nitrification degree of product*

| No. | Calcination temp. (°C.) | Nitrification temp. (°C.) | Nitrification degree (%) |
|---|---|---|---|
| (12) | 650 | 1000 | 0.1 |
| (13) | 650 | 1100 | 87.4 |
| 14 | 650 | 1200 | 100 |
| 15 | 650 | 1300 | 100 |
| 16 | 650 | 1400 | 100 |
| 17 | 650 | 1460 | 100 |
| 18 | 650 | 1650 | 100 |

*Nitrifaction degree = (Increment of oxide as measured with thermobalance) /(theoretcal increment as AlN is oxidized)

(EXAMPLE 6)

The short fibers of $\gamma$-$Al_2O_3$ obtained in the same manner as in the case of the sample No. 5 in Example 3 (Table 2) were calcined to obtain $\gamma$-$Al_2O_3$ fibers.

The $\gamma$-$Al_2O_3$ fibers were then heat-treated in four kinds of mixed gas stream, each consisting essentially of an ammonia gas and 2% by volume of methane gas, ethane gas, propane gas or butane gas at a temperature of 1,400° C. for one hour to obtain aluminum nitride fibers. Thus obtained aluminum nitride fibers were subjected to a treatment by heating them in the atmosphere at 700° C. for two hours.

The crystalline phase of these aluminum nitride fibers thus obtained were examined by means of X-ray diffraction. The results obtained are shown in Table 6 (No. 19 to No. 22).

TABLE 6

Relationship between kinds of hydrocarbon gas and crystalline phase of nitrified fibers

| No. | Kinds of gas | Crystalline phase of nitrified fibers |
|---|---|---|
| 19 | Methane ($CH_4$) | AlN |
| 20 | Ethane ($C_2H_6$) | AlN |
| 21 | Propane ($C_3H_8$) | AlN |
| 22 | Propane ($C_4H_{10}$) | AlN |

As seen from Table 6, any substantial difference regarding the crystalline phase of these aluminum nitride fibers could not be recognized irrespective of the difference in the kinds of hydrocarbon employed. Therefore, the employment of most inexpensive propane gas is preferable.

(EXAMPLE 7 AND COMPARATIVE EXAMPLE 3)

The short fibers of $\gamma$-$Al_2O_3$ obtained in the same manner as in the case of the sample No. 5 in Example 3 (Table 2) were calcined with the calcination temperature being variously changed in the range of 300° to 1,000° C. as shown in Table 7.

The calcined short fibers were then heat-treated in mixed gas stream consisting essentially of 2% by volume of propane gas and the balance of ammonia gas at a temperature of 1,400° C. for one hour to obtain aluminum nitride fibers. Thus obtained fibers were subjected to a treatment by heating them in an $N_2$ gas atmosphere at 1800° C. for 2 hours.

The crystalline phase of aluminum nitride fibers thus obtained were examined by means of X-ray diffraction, and then the content of oxygen in the fibers was measured using an oxygen/nitrogen simultaneous analyzer. The results obtained are shown in Table 7.

TABLE 7

Relationship between calcination temperature and content of O$_2$ in AlN fibers

| No. | Calcination temp. (°C.) | Crystalline phase of nitrified fibers | Content of O$_2$ in fibers (wt %) |
|---|---|---|---|
| 23 | 300 | AlN | 0.8 |
| 24 | 500 | AlN | 0.7 |
| 25 | 900 | AlN | 0.4 |
| 26 | 1100 | AlN | 0.4 |
| (27) | 1300 | α-Al$_2$O$_3$ AlN | 26 |

As seen from Table 7, there was not recognized any substantial difference in crystalline phase of aluminum nitride fibers as long as the calcination temperature was selected from the range of 300° to 1,100° C.

Figure 5:
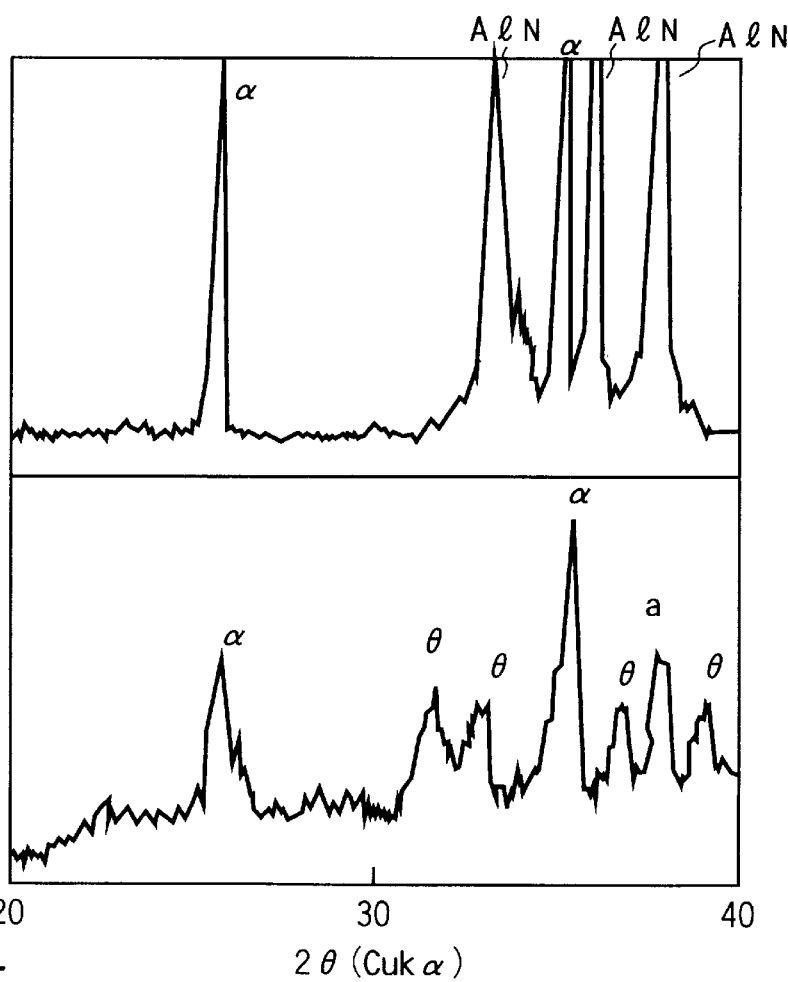
FIG. 5 is a graph showing both x-ray diffraction of alumina (a mixture of α-alumina and θ-alumina) which is not to be employed in this invention, and X-ray diffraction of the above-mentioned aluminum which has been subjected to a nitrification treatment.

As sample of Comparative Example (No. 27), the same fibers as those of above Example was calcined at a temperature of 1,300° C. to find out that the resultant fibers were consisted of a mixture of α-Al$_2$O$_3$ and θ-Al$_2$O$_3$. When the fibers were subjected to a nitrification treatment at the same temperature and treatment time as those of above Example, and then further to a heat treatment at 1800° C. for 2 hours, the fibers were consisted of a mixture of α-Al$_2$O$_3$ and AlN. FIG. 5 shows a graph of X-ray diffraction as measured on the calcined product obtained in prior to the nitrification treatment and the nitrified product obtained after the nitrification treatment.

(EXAMPLE 8)

To 3,200 g of a solution of aluminum hydroxy chloride (the content of Al therein was 23.5 wt. % when calculated as Al$_2$O$_3$) were added 697 g of 10 wt. % conc. polyvinyl alcohol solution and 200 g of 18 wt. % conc. colloidal silica to obtain a mixed solution. After stirring, this mixed solution was concentrated by making use of a rotary evaporator to obtain a gel-like material having a viscosity of 35 poise at a temperature of 20° C. (a precursor of γ-Al$_2$O$_3$).

This viscous liquid was spun in the same manner as in Example 3 to obtain short fibers.

The short fibers were then heat-treated in mixed gas consisting essentially of 2% by volume of propane gas and ammonia gas at a temperature of 1,450° C. for 2 hours to obtain aluminum nitride fibers. Thus obtained fibers were subjected to a heat treatment in an ammonia gas atmosphere at 1700° C. for 2 hours. When the crystalline phase of aluminum nitride fibers thus obtained were examined by means of X-ray diffraction, only the AlN phase could be recognized.

The fibers thus obtained were more or less lower in elasticity as compared with that of the fibers obtained in No. 3 to No. 5 of Example 3.

The same procedures as illustrated above were repeated except that 100 g of 10 wt. % conc. colloidal zirconia was employed in place of 18 wt. % conc. colloidal silica and the nitrification temperature was selected to be 1,350° C. instead of 1,450° C. to obtain aluminum nitride fibers. Then, a heat treatment was carried out in a similar manner to that of Example 7. When the crystalline phase of aluminum nitride fibers thus obtained were examined by means of X-ray diffraction, only the AlN phase could be recognized.

The fibers thus obtained were found to be more or less shorter in fiber length as compared with that of the fibers obtained with the employment of aforementioned colloidal alumina, or that of the fibers obtained in No. 3 to No. 5 of Example 3.

We claim:

1. A method of manufacturing an aluminum nitride, which comprises the steps of:
    (a) preparing a mixed gas consisting essentially of an ammonia gas and at least 0.5% by volume of a hydrocarbon gas;
    (b) calcining γ-Al$_2$O$_3$ or a precursor thereof at a temperature of 300° to 1,100° C. so as to prepare the γ-Al$_2$O$_3$ having a moisture content of 1 weight % or less;
    (c) heating the calcined γ-Al$_2$O$_3$ in said mixed gas at a temperature of 1,200° to 1,700° C., thereby preparing porous aluminum nitride having a specific surface area of 10 m$^2$/g or more; and
    (d) heat-treating the porous aluminum nitride in an atmosphere of an ammonia gas or a mixed gas of an ammonia gas and an inert gas at 1600° to 2000° C., so as to make contents of both carbon and oxygen contained in the aluminum nitride 1 weight % or less.

2. A method of manufacturing an aluminum nitride, which comprises the steps of:
    (a) preparing a mixed gas consisting essentially of an ammonia gas and at least 0.5% by volume of a hydrocarbon gas;
    (b) calcining γ-Al$_2$O$_3$ or a precursor thereof at a temperature of 300° to 1,100° C. so as to prepare the γ-Al$_2$O$_3$ having a moisture content of 1 weight % or less;
    (c) heating the calcined γ-Al$_2$O$_3$ in said mixed gas at a temperature of 1,200° to 1,700° C., thereby preparing porous aluminum nitride having a specific surface area of 10 m$^2$/g or more;
    (d) subjecting the porous aluminum nitride to an oxidation-decarbonization in an atmosphere at 600° to 800° C.; and
    (e) heat-treating the porous aluminum nitride in an atmosphere of an inert gas at 1,600° to 2000° C., so as to make contents of both carbon and oxygen contained in the aluminum nitride 1 weight % or less.

3. The method according to claim 1, wherein said hydrocarbon is at least one compound selected from the group consisting of propane, methane, ethane and butane.

4. The method according to claim 1, wherein the heating temperature for preparing the porous aluminum nitride is in the range of 1,300° to 1460° C.

5. The method according to claim 1, wherein the γ-Al$_2$O$_3$ is in the form of particle or flake.

6. The method according to claim 1, wherein the precursor of γ-Al$_2$O$_3$ is selected from the group consisting of aluminum alkoxide, aluminum sulfate, aluminum alum, ammonium aluminum carbonate, aluminum hydroxy chloride and boehmite.

7. The method according to claim 1, wherein the γ-Al$_2$O$_3$ is formed using, as a sole alumina source or as part of alumina source, aluminum hydroxy chloride.

8. The method according to claim 1, wherein a temperature for heat-treating the porous aluminum nitride in the atmosphere of the ammonia gas, or the mixed gas of the ammonia gas and the inert gas, is 1,600° to 1800° C.

9. The method according to claim 2, wherein a temperature for heat-treating the porous aluminum nitride in the atmosphere of the inert gas, is 1,600° to 1800° C.

10. A method of manufacturing aluminum nitride fibers, which comprises the steps of:

(a) preparing a mixed gas consisting essentially of an ammonia gas and at least 0.5% by volume of a hydrocarbon gas;

(b) dispersing a precursor of $\gamma$-$Al_2O_3$ in a dispersion containing a binder and one material selected from the group consisting of colloidal silica, colloidal alumina and colloidal zirconia;

(c) concentrating said dispersion containing said precursor dispersed therein;

(d) spinning short fibers from the concentrated dispersion placed in a centrifugal spinning machine by rotating the centrifugal spinning machine;

(e) drying the spun short fibers;

(f) calcining the dried short fibers at a temperature of 300° to 1,100° C. so as to make a moisture content 1 weight % or less;

(g) heat-treating the calcined short fibers in said mixed gas consisting essentially of a hydro-carbon gas and an ammonia gas at a temperature of 1,200° to 1,700° C., so as to form porous aluminum nitride fibers having a specific surface area of 10 $m^2$/g or more; and (h) heat-treating the porous aluminum nitride fibers in an atmosphere of an ammonia gas, or a mixed gas of an ammonia gas and an inert gas, at 1,600° to 2000° C., so as to make contents of both carbon and oxygen contained in the aluminum nitride fibers 1 weight % or less.

11. A method of manufacturing aluminum nitride fibers, which comprises the steps of:

(a) preparing a mixed gas consisting essentially of an ammonia gas and at least 0.5% by volume of a hydrocarbon gas;

(b) dispersing a precursor of $\gamma$-$Al_2O_3$ in a dispersion containing a binder and one material selected from the group consisting of colloidal silica, colloidal alumina and colloidal zirconia;

(c) concentrating said dispersion containing said precursor dispersed therein;

(d) spinning short fibers from the concentrated dispersion placed in a centrifugal spinning machine by rotating the centrifugal spinning machine;

(e) drying the spun short fibers;

(f) calcining the dried short fibers at a temperature of 300° to 1,100° C. so as to make a moisture content 1 weight % or less;

(g) heat-treating the calcined short fibers in said mixed gas consisting essentially of a hydrocarbon gas and an ammonia gas at a temperature of 1,200° to 1,700° C., so as to form porous aluminum nitride fibers having a specific surface area of 10 $m^2$/g or more;

(h) subjecting the porous aluminum nitride fibers to an oxidation-carbonization in an atmophere at a temperature of 600° to 800° C.; and (g) heat-treating the porous aluminum nitride fibers in an atmosphere of an inert gas, at 1,600° to 2000° C., so as to make contents of both carbon and oxygen contained in the aluminum nitride fibers 1 weight % or less.

12. The method according to claim 10, wherein said hydrocarbon gas is at least one compound selected from the group consisting of propane, methane, ethane and butane.

13. The method according to claim 10, wherein said temperature for preparing the porous aluminum nitride fibers is in the range of 1,300° to 1,460° C.

14. The method of manufacturing aluminum nitride fibers according to claim 10, wherein the precursor of $\gamma$-$Al_2O_3$ is formed using, as a sole alumina source or as part of alumina source, aluminum hydroxy chloride.

15. The method according to claim 2, wherein said hydrocarbon is at least one compound selected from the group consisting of propane, methane, ethane and butane.

16. The method according to claim 2, wherein the heating temperature for preparing the porous aluminum nitride is in the range of 1,300° to 1,460° C.

17. The method according to claim 2, wherein the precursor of $\gamma Al_2O_3$ is selected from the group consisting of aluminum alkoxide, aluminum sulfate, aluminum alum, ammonium aluminum carbonate, aluminum hydroxy chloride and boehmite.

18. The method according to claim 2, wherein the $\gamma$-$Al_2O_3$ is formed using, as a sole alumina source or as part of alumina source, aluminum hydroxy chloride.

19. The method according to claim 11, wherein said hydrocarbon gas is at least one compound selected from the group consisting of propane, methane, ethane and butane.

20. The method according to claim 11, wherein said temperature for preparing the porous aluminum nitride fibers is in the range of 1,300° to 1,460° C.

21. The method of manufacturing aluminum nitride fibers according to claim 11, wherein the precursor of $\gamma$-$Al_2O_3$ is formed using, as a sole alumina source or as part of alumina source, aluminum hydroxy chloride.

* * * * *